United States Patent Office 3,275,611
Patented Sept. 27, 1966

---

3,275,611
PROCESS FOR POLYMERIZING UNSATURATED MONOMERS WITH A CATALYST COMPRISING AN ORGANOBORON COMPOUND, A PEROXYGEN COMPOUND AND AN AMINE
Edward H. Mottus and Joseph E. Fields, Ballwin, Mo., assignors to Monsanto Company, St. Louis, Mo., a corporation of Delaware
No Drawing. Filed Jan. 15, 1965, Ser. No. 425,958
22 Claims. (Cl. 260—80.5)

This application is a continuation-in-part of copending application Serial No. 79,672, filed December 30, 1960, and now abandoned. This invention relates to a new process for polymerizing olefinic compounds using a new multiple component catalyst and to new catalyst components usable in the process.

It is known to use boron compounds with peroxygen compounds to polymerize olefinic compounds. For example in an article titled "Catalytic Reactivity of Organo-metallic Compounds for Olefin Polymerization" in Makromolekulare Chemie. 31, 122 (1959), by Junji Furukawa et al., such catalytic polymerization is discussed. Also in this literature article many other articles describing related work are cited giving a good background summary of the prior art. Polymerization of olefinic monomers such as methyl methacrylate has been found to proceed relatively slowly to high conversion especially at low temperatures with such catalysts. It has now been found that when amines such as pyridine or complexing agents of comparable basicity are used in conjunction with these catalysts increased rates of conversion to high yields and certain other advantages result. The process of this invention is especially useful for producing polymers such as are described in copending applications Serial Nos. 79,500, now abandoned, and 79,671 both filed December 30, 1960, and especially those produced at low temperatures.

It is an object of this invention to provide a new process for polymerizing olefinic compounds using boron and peroxygen compound catalysts.

It is another object of this invention to provide new organoboron complexes usable as a catalyst component in the process of the invention.

It is another object of this invention to provide a new process which gives increased rates of polymerization to high yield using boron and peroxygen compound catalysts.

It is another object of this invention to provide a new polymerization process giving better temperature control when using boron and peroxygen compound catalysts.

It is another object of this invention to provide a new process providing higher molecular weight polymers using boron and peroxygen compound catalysts.

These and other objects of the invention will become apparent as the detailed description of the invention proceeds.

In the new process for optimum results the amine and boron compounds are used in about 1:1 molar ratio assuming there is one nitrogen function per boron function in these compounds, i.e. equivalent amounts in analogy to acids and bases. If this ratio varies as little as about 10% either low or high, the time required to obtain high conversion is substantially increased, except when the molar ratio of the peroxygen compound to the boron compound is in excess of 1 in which case the effect on conversion rate is small; however, the process is operable to produce improved results no matter how little or how much complexing agent is used, since some improvement in conversion with time will be accomplished in the process of the invention as compared to the use of no complexing agent with the boron compound. At least a sufficient amount of complexing agent should be used to increase conversion as compared to no complexing agent, and normally there will be used from 0.1 to 10 moles of complexing agent per mole of boron compound; however, either about an equivalent amount or a molar amount depending on the complexing agent normally produces optimum results. Polar monomers are the preferred monomers to use in the process of the invention, although non-polar monomers can be used. A molar ratio of boron compound to peroxygen compound assuming both are mono-functional in the range of about 0.05 to about 10.0, preferably about 0.2 to about 7.0 is most useful in the process of the invention. Based on monomers charged to the process normally the amount of boron compound should be in the range of about 0.05 mole percent to about 5.0 mole percent, preferably about 0.1 mole percent to about 2.0 mole percent. Normally it is preferred to carry out the process in the presence of an inert atmosphere and to add the amine before both the peroxygen compound and the boron compound have been added to the reaction mixture. Alternatively the amine can be added to the reaction mixture as a preformed boron compound amine complex, which may have the advantage of making the boron compound more easily handled especially for boron compounds such as triethyl boron which tends to be pyrophoric in air but is not pyrophoric when complexed with for example pyridine. The process of the invention is particularly effective and advantageous at temperatures below those conventionally used in peroxygen compound polymerization. The process can be carried out in the presence or absence of an inert liquid solvent or reaction medium and can be carried out in the presence or absence of chain-breakers to regulate molecular weight if desired. Another suitable way of carrying out the process especially for the production of oil-soluble methacrylate polymers is to carry out the polymerization for a limited time in mass then add an oil such as mineral white oil before completing the polymerization with the result that the molecular weight of the polymer is desirably limited and a concentrate of the polymer in oil is formed suitable for blending back in oil for use. Major amount when used in conjunction with a monomer mixture means more than 50% by weight, and a minor amount means less than 50% by weight, and obviously where more than one minor amount is stated the total of all the minor amounts must add up to less than 50% by weight.

The process of the invention is applicable to the polymerization of olefinic compounds and particularly α-olefinically unsaturated compounds or α-olefinically unsaturated compounds mixed with other olefinic compounds, preferably those monomers having not more than 20 carbon atoms. More particularly the process is applicable to the polymerization of olefinically unsaturated monomers which undergo addition polymerization with boron and peroxygen compound catalysts. Polar monomers are especially desirable for use in the process of the invention. The monomer or mixed monomers should not contain any substantial amount of basic monomers which have ionization constants of more than $10^{-5}$, preferably $10^{-6}$ and more preferably should not contain any substantial amount of basic monomers which are as or more basic than pyridine, e.g. dimethylaminoethyl methacrylate, for obtaining maximum benefits from the process, but monomers with substantially less basicity than pyridine, e.g. N-vinyl-2-pyrollidone will do no harm, i.e. having ionization constants of about $10^{-11}$ or less. The compounds can have a plurality of olefinic linkages.

Especially suitable monomers for use in the process of the invention are methacrylate monomers having not more than 20 carbon atoms in the ester group, for example, methacrylic acid, methyl methacrylate, ethyl methacrylate, n-propyl methacrylate, isopropyl methacrylate, n-butyl methacrylate, isobutyl methacrylate, t-butyl methacrylate, n-hexyl methacrylate, n-heptyl methacrylate, n-octyl methacrylate, 2-ethylhexyl methacrylate, n-decyl methacrylate, n-dodecyl methacrylate, t-dodecyl methacrylate, oxo-tridecyl methacrylate, lauryl methacrylate, "Lorol" methacrylate, tallow methacrylate, n-eicosyl methacrylate, cyclohexyl methacrylate, methoxymethyl methacrylate, n-butoxyethyl methacrylate, n-butoxyethoxyethyl methacrylate, chloroethyl methacrylate, etc. Alkyl methacrylates having not more than 20 carbon atoms in the alkyl groups are especially preferred.

Ethylenically unsaturated hydrocarbons are also polymerizable by the method of the invention. For example, ethylene, propylene, butylene, isobutylene, 1-octene, 1-dodecene, 1-heptadecene, 1-eicosene, etc. Vinyl compounds, such as styrene, vinyl pyridine, 5-methyl-2-vinyl pyridine, vinyl naphthylene, α-methyl styrene, etc. are especially suitable since they are polar compounds.

A great many other types of olefinically unsaturated monomers are also polymerizable by the process of the invention. For example, acrylic acid and the acrylates corresponding to the methacrylates named herein are also polymerizable by the process of the invention. Also such monomers as α-chloroacrylic acid, vinyl and vinylidene halides such as vinyl chloride, vinyl fluoride, vinylidene chloride, vinylidene fluoride, 1-fluoro-1-chloroethylene; acrylonitrile and methacrylonitrile; vinyl acetate, vinyl propionate; vinyloxyethanol; vinyl trimethyl acetate, vinyl hexonate, vinyl laurate, vinyl chloroacetate, vinyl stearate; methyl vinyl ketone, vinyl isobutyl ether, vinyl ethyl ether, etc. Also by the process of the invention such monomers as polyfluoro ethylene of the general formula $CF_2=CXY$, where X is H, Cl, or F and Y is Cl or F, may be employed alone or copolymerized with ethylene or other monomers including tetrafluoroethylene, chlorotrifluoroethylene, trifluoroethylene, and 1,1-dichloro-2,2-difluoroethylene, etc.

By the process of the invention copolymers or higher interpolymers can suitably be produced, e.g. ethylene/vinyl chloride, ethylene/vinyloxyethanol, ethylene/vinyl acetate, ethylene/maleic anhydride, ethylene/tetrafluoroethylene, acrylonitrile/isobutylene, isobutylene/vinylidene chloride, isobutylene/vinyl acetate, vinyl acetate/vinyl methyl ether, lauryl methacrylate/vinyloxyethanol, lauryl methacrylate/styrene, vinyl chloride/vinyl acetate, styrene/maleic anhydride, etc.

Polymerizable compounds that have a plurality of ethylenic bonds are also useful in the process of the invention including those having conjugated double bonds such as butadiene, 2-chlorobutadiene, 2-fluorobutadiene, 2-phenoxybutadiene, etc. Compounds such as methacrylic anhydride, ethylene glycol dimethacrylate, diethylene glycol dimethacrylate, triethylene glycol dimethacrylate, tetraethylene glycol dimethacrylate, diethylene glycol diacrylate, decamethylene glycol diacrylate, glycerol triacrylate, dimethacrylate esters of polyethylene glycols, diallyl maleate, vinyl methacrylate, allyl methacrylate, crotol methacrylate, methallyl methacrylate, diallyl phthalate, diallyl carbonate, diallyl adipate diallyl fumarate, divinyl succinate, divinyl adipate, divinyl benzene, etc. These compounds can be polymerized alone but are usually polymerized in minor amount with other monomers.

In general monomers which are polymerizable by peroxygen compound catalysis are also suitably polymerized by the process of the invention, but for the most part, compounds which have a terminal methylene group are preferred as polymerizable monomeric compounds. Other compounds which are polymerizable include the following. Fumaric and maleic acid and derivatives such as maleic anhydride, dialkyl esters of fumaric and maleic acids, e.g. diethyl and dimethyl fumarate and maleate can be copolymerized with ethylene, vinyl chloride, styrene, methacrylates, acrylates and the like by the process of the invention. Also by the process of the invention, copolymers from ethylene, propylene, isobutylene, 2-ethylhexene-1 and mixed isobutylene/vinyl isobutyl ether with maleic anhydride; copolymers of isobutylene with vinyl acetate, dimethyl fumarate and dimethyl maleate; copolymers of allyl chloride with maleic anhydride; copolymers of styrene with maleic anhydride and the condensation product of maleic anhydride and ethylene glycol; and the copolymer of styrene with the condensation product of maleic anhydride and propylene oxide. Carbon monoxide, sulfur dioxide and acetylene are likewise copolymerizable with ethylene and like monomers by the process of the invention. In addition telomeric homopolymers and copolymers can be advantageously produced by the process of the invention in the presence of chain transfer agent customarily used in peroxygen compound catalysis.

Boron compounds useful in the process of the invention are those having an organo group attached by carbon directly to the boron, i.e. organoboron compounds. Boron compounds especially useful in the process of the invention as catalyst components are compounds of the following general formulas: $R_3B$, $RB(OR)_2$, $R_2B(OR)$, $R_2BOBR_2$, $R_2BX$, $R_2BH$ and the like where R is a hydrocarbon radical preferably an alkyl radical having from 1 to 10 or more carbon atoms and X is halogen. The R's can be the same or different. Especially preferred are the lower (up to 6 carbon) trialkyl boron compounds. An illustrative but non-limiting list of suitable boron compounds is the following: trimethyl boron, triethyl boron, tri-n-propyl boron, triisopropyl boron, triisobutyl boron, tri-n-butyl boron, tri-t-butyl boron, tri-n-hexyl boron, tri-n-octyl boron, butyl diethyl boron, tricyclohexyl boron, tridecyl boron, triphenyl boron, the tritolyl boron, the trixylyl boron, the trinaphthyl boron, tribenzyl boron, n-butyl di-n-butyl boronite, di-n-butyl n-butyl boronite, di-n-butyl boronoxide, di-n-butyl n-butyl boronate, di-n-butyl boron bromide, di-n-butyl boron chloride, diethyl boron hydride, etc.

Any peroxide or hydroperoxide may be used as a catalyst component in the process of the invention. Illustrative of the suitable peroxides are the following: hydrogen peroxide, benzoyl peroxide, dicumyl peroxide, cumene hydroperoxide, sodium or potassium perborate, peracetic acid, sodium or barium peroxide, lauryl peroxide, ammonium persulfate, urea hydroperoxide, t-butyl hydroperoxide, t-butyl perbenzoate, 2,4-dichlorobenzoyl peroxide, diethyl peroxide, ethyl hydroperoxide, succinic mono peracid, etc.

As complexing agents for the process of the invention, compounds having basicities in the range of less than $10^{-5}$ and greater than $10^{-11}$, preferably in the range of about $10^{-6}$ or $10^{-7}$ to $5 \times 10^{-10}$ or $10^{-10}$ are useful. Enumerated below are a number of such suitable compounds which are meant to be merely illustrative and not limiting of the invention. Ionization constants for these compounds are found in Lange's Handbook of Chemistry, 9th edition, pages 1202–4 (1956). The complexing agents are: aniline, apomorphine, benzidine, beryllium hydroxide, brucine, cinchonidine, cinchonine, cocaine, codeine, creatine, creatinine, dimethylaminoantipyrine, dimethylbenzylamine, emetine, hydrastine, hydrazine, hydroquinine, hydroxylamine, morphine, α-naphthylamine, β-naphthylamine, narceine, narcotine, nicotine, novocain, papaverine, p-phenetidine, o-phenylenediamine, p-phenylenediamine, phenylhydrazine, physostigmine, pilocarpine, pyridine, quinidine, quinine, quinoline, semicarbazide, solanine, strychnine, thebaine, o-toluidine, m-toluidine, p-toluidine, veratrine, etc. Also polymers or copolymers of such monomers as vinyl pyridine will have basicities within the useful range and these polymers will be useful complexing agents for the process of the invention. Difunctional amines such as quinidine having both functional groups with ionization constants within the desired range might be used in about ½ the molar amount that, e.g. pyridine would be used, and other amines which are correspondingly polyfunctional may be used in equivalent rather than molar amounts; however, where the higher ionization constant of a difunctional amine is nearer to optimum for highest conversion, it still may be desirable to use a molar amount since the higher ionization constant nitrogen will tend to complex all the boron compound and promote the conversion to the highest degree.

The invention will be more clearly understood from the following detailed description of specific examples thereof.

EXAMPLE 1

This example describes the preparation of a lauryl methacrylate/methyl methacrylate copolymer by the process of the invention. To a flask were added 45.7 g. (0.18 mole) of lauryl methacrylate, 7.0 g. (0.07 mole) of methyl methacrylate and 0.30 ml. (1.5 mole percent) of pyridine. The mole percent of pyridine is based on monomers charged and the same is true of the amounts of triethyl boron and cumene hydroperoxide later recited; also, all subsequent examples use this same basis. The monomers and pyridine were cooled to about 0° C. under nitrogen and 0.55 ml. (1.5 mole percent) of triethyl boron was added to the reaction mixture. After the addition of the triethyl boron, 0.23 ml. (0.45 mole percent) of cumene hydroperoxide was added to the reaction mixture. The mixture was vigorously stirred and cooled to keep reaction temperature at between about 1 and 2° C. During the polymerization run four samples were taken of the reaction mixture and these samples were analyzed to determine percent conversion and certain other information. The results of the analysis of these samples are summarized in the table below.

| Sample No. | Time, Hours | Wt. of Sample, grams | Wt. of Polymer, grams | Conversion, Percent | Specific Viscosity |
|---|---|---|---|---|---|
| 1 | ½ | 4.56 | 1.1700 | 25.7 | 0.412 |
| 2 | 1½ | 3.89 | 1.4966 | 38.5 | 0.595 |
| 3 | 2½ | 2.71 | 1.4527 | 53.6 | 0.742 |
| 4 | 3½ | 2.31 | 1.6368 | 70.9 | 0.873 |

In the table above, the time reported indicates the time at which the sample was taken after the beginning of polymerization which was the time of the addition of the cumene hydroperoxide. To recover the polymer the sample was added to methanol to precipitate the polymer, the recovered polymer was dissolved in benzene and the polymer precipitated from the benzene with methanol. This purified polymer was then dried in a vacuum oven at 60° C. overnight to give the amount of polymer reported in the table. The specific viscosity of the polymer is specific viscosity determined for a 1% solution of the polymer in benzene at 25° C. This is the method of specific viscosity determination used in subsequent examples and Table 1 unless otherwise stated.

The polymerization run was continued overnight at 1-2° C. to give a total polymerization time of 21 hours. The amount of reaction mixture remaining in the flask at the end of the polymerization run was 37.8 g. This reaction mixture was dissolved in benzene and the polymer precipitated by adding methanol. The polymer was further purified by two additional steps of dissolving in benzene and precipitating from methanol. The recovered purified polymer was dried in a vacuum oven overnight at 60° C. The dry weight of the purified polymer was 35.4 g. giving a yield of 93.7%. This polymer had a specific viscosity of 1.746 determined for 1% polymer in benzene at 25° C.

EXAMPLE 2

This example was carried out in a manner identical to Example 1 except that a slight excess of pyridine was used over and above that used in Example 1, i.e. about 2 drops over the 0.30 ml. of pyridine which is in excess of about 3–5%. The results of analyzing the samples taken during the run are reported in the table below.

| Sample No. | Time, Hours | Wt. of Sample, grams | Wt. of Polymer, grams | Conversion, Percent | Specific Viscosity |
|---|---|---|---|---|---|
| 1 | ½ | 4.41 | 0.6800 | 15.4 | 0.860 |
| 2 | 1 | 3.86 | 0.8564 | 22.2 | 0.861 |
| 3 | 2 | 4.04 | 1.4320 | 35.4 | 0.962 |
| 4 | 4 | 2.52 | 1.4118 | 56.0 | 1.220 |

One additional variation from Example 1 is that polymerization time was only the total of 6 hours after which time the polymerization was stopped and the polymer was recovered in a manner similar to Example 1. At the end of the run, the reaction mixture residue remaining in the flask was 37.5 g. From this reaction mixture 32.2 g. of purified polymer were recovered giving a yield of 86%. This polymer had a specific viscosity of 3.892 determined from a 1% solution of the polymer in benzene at 25° C.

EXAMPLE 3

This example is a repeat of Example 1 using the shortened reaction time of Example 2 but with the same amount of pyridine as used in Example 1. A summary of the results of analysis of the samples taken during the run is reported in tabular form below:

| Sample No. | Time, Hours | Wt. of Sample, grams | Wt. of Polymer, grams | Conversion, Percent | Specific Viscosity |
|---|---|---|---|---|---|
| 1 | ½ | 4.25 | 1.1045 | 26.0 | 0.528 |
| 2 | 1½ | 4.04 | 1.4790 | 36.6 | 0.603 |
| 3 | 2 | 3.25 | 1.8000 | 55.4 | 0.778 |
| 4 | 4 | 3.19 | 2.6584 | 83.3 | 2.011 |

The reaction mixture residue remaining in the flask after the 6 hours of polymerization time was 36.0 g. Purified dried polymer recovered was 34.6 g. giving a yield of 96.1%. This polymer had a specific viscosity of 2.700 determined in benzene in the usual manner. It is clear from an examination of Examples 1, 2 and 3 that a molar excess of pyridine over equal molar amounts with the triethyl boron slows down the polymerization process.

EXAMPLE 4

This example describes an attempt to substitute another amine for pyridine in the process of the invention. To the reaction flask were charged 48.2 g. (0.18 mole) of a mixture of straight-chain alkyl methacrylates, 7.0 g. (0.07 mole) of methyl methacrylate and 0.33 ml. (1.5 mole percent) of aniline. The mixture of straight-chain alkyl methacrylates referred to in this example above comprises 3% $C_{10}$, 61% $C_{12}$, 23% $C_{14}$, 11% $C_{16}$ and 2% $C_{18}$ alkyl methacrylates. The monomers were cooled under nitrogen in an ice bath to about 0° C. before the aniline addition. Then 0.55 ml. (1.5 mole percent) of triethyl boron was added to the reaction flask followed by the addition of 0.23 ml. (0.45 mole percent) of cumene hydroperoxide. After a period of 6 hours of polymerization at a temperature of about 1° and 2° C., benzene was added to the reaction mixture to dissolve the polymer and the polymer product was separated and purified in the usual manner to give 29.9 g. (54.2%) of dried purified polymer having a specific viscosity of 0.467.

EXAMPLE 5

This example describes an attempt to carry out the process of the invention using yet another amine instead of pyridine. To the reaction flask were added 48.2 g. (0.18 mole) of the mixture of straight-chain alkyl methacrylates referred to in Example 4 and 7.0 g. (0.07 mole) of methyl methacrylate. The monomers were cooled under nitrogen in an ice bath to about 0° C. after which time 0.89 ml. (1.5 mole percent) of tri-n-butylamine was added to the monomers. Then 0.55 ml. (1.5 mole percent) of triethyl boron was added and followed by the addition of 0.23 ml. (0.45 mole percent) of cumene hydroperoxide. The reaction mixture was held at 1–2° C. for 6 hours after which time the mixture was poured into methanol. The polymer was separated and purified in the usual fashion to give 6.4 g. (11.6%) of dried purified polymer having a specific viscosity of 0.702.

EXAMPLE 6

This example represents an attempt to use a different type of complexing agent than an amine in the process of the invention. To the reaction flask were added 48.2 g. (0.18 mole) of the mixture of straight-chain alkyl methacrylates referred to in Example 4 and 7.0 g. (0.07 mole) of methyl methacrylate. The monomers were cooled to 0° C. under nitrogen in an ice bath and 0.62 ml. (1.5 mole percent) of di-n-butyl ether were added to the monomers. Then 0.55 ml. (1.5 mole percent) of triethyl boron was added followed by the addition of 0.23 ml. mole percent) of cumene hydroperoxide. Polymerization was conducted for a period of 6 hours at temperatures of less than about 1°–2° C. At the end of the polymerization time, benzene was added to dissolve the polymer and the polymer was purified and dried in the usual manner. There were recovered 14.6 g. (26.4%) of purified dried polymer having a specific viscosity of 1.019.

EXAMPLE 7

This example represents the evaluation of a complexing agent having substantially the same basic ionization constant as pyridine, namely p-toluidine. The base constant of pyridine is $1.4 \times 10^{-9}$ and for toluidine $2.0 \times 10^{-9}$. To the reaction flask were charged 48.2 g. (0.18 mole) of the mixture of straight-chain alkyl methacrylates referred to in Example 4 and 7.0 g. (0.07 mole) of methyl methacrylate. The monomers were cooled under nitrogen blanketing in an ice bath to about 0° C. and 0.4018 g. (1.5 mole percent) of p-toluidine was added to the monomer. Then 0.55 ml. (1.5 mole percent) of triethyl boron and 0.23 ml. (0.45 mole percent) of cumene hydroperoxide were added in the order given. Polymerization was carried out at temperatures between about 1°–2° C. for a period of 4 hours. During the polymerization run, two samples were taken and analyzed to determine percent conversion and specific viscosity. The results of the analysis of these samples is summarized in the table below.

| Sample No. | Time, Hours | Wt. of Sample, grams | Wt. of Polymer, grams | Conversion, Percent | Specific Viscosity |
|---|---|---|---|---|---|
| 1 | ½ | 4.09 | 2.2222 | 54.3 | 0.212 |
| 2 | 1 | 3.22 | 2.0818 | 64.7 | 0.276 |

After the four hours of polymerization at temperatures in the range of about 1°–2° C. the reaction mixture was added to benzene to dissolve the polymer and the polymer was purified and dried in the usual manner; however, before the addition of the benzene, the amount of reaction mixture remaining in the flask was determined to be 45.9 g. The purified and dried polymer recovered was 37.4 g. (81.5 percent yield) of a polymer having a specific viscosity of 0.408. It is indicated by this example that p-toluidine is approximately as effective as pyridine.

EXAMPLE 8

This is another example illustrating the process of the invention. To a reaction flask were charged 29.0 g. (0.11 mole–43.3 percent) of oxo-tridecyl methacrylate, 20.5 g. (0.06 mole–24.9 mole percent) of tallow methacrylate and 8.0 g. (0.08 mole–31.8 mole percent) of methyl methacrylate. Tallow methacrylate is a mixture of about 33% $C_{16}$ and 67% $C_{18}$ straight-chain alkyl methacrylate. The monomers were cooled under nitrogen blanketing to 0° C. and tallow methacrylate began to precipitate so the reaction mixture was allowed to warm up to room temperature. 0.30 ml. (1.5 mole percent) of pyridine was added to the monomers, then 0.55 ml. (1.5 mole percent) of triethyl boron and 0.23 ml. (0.45 mole percent) of cumene hydroperoxide were added to the reaction mixture. The reaction mixture was maintained at about 21° C. for two hours after which time benzene was added to bring the polymer into solution. The reaction mixture was worked up in the usual way to recover the polymer. Yield of polymer was 90.6%. This polymer had a specific viscosity of 1.345 at 1% polymer concentration in benzene at 25° C.

EXAMPLE 9

In this and a number of the following examples the amount and ratio of catalyst components was varied to see the effect. To the reaction flask was charged 29.0 g. of oxotridecyl methacrylate, 20.5 g. of tallow methacrylate and 8.0 g. of methyl methacrylate. The monomers were cooled to about 21° C. and 0.20 ml. (1 mole percent) of pyridine was added. Then 0.37 ml. (1 mole percent) of triethyl boron and 0.15 ml. (0.3 mole percent) of cumene hydroperoxide were added in the usual manner. Polymerization time was 2 hours at about 21° C. Two samples were taken during the run, and the results of the analysis of these two samples are as follows:

| Sample No. | Time, Hours | Wt. of Sample, grams | Wt. of Polymer, grams | Conversion, Percent | Specific Viscosity |
|---|---|---|---|---|---|
| 1 | ½ | 3.95 | 1.7714 | 44.8 | 0.543 |
| 2 | 1 | 3.52 | 2.5411 | 72.1 | 0.792 |

At the end of the run the weight of reaction mixture remaining in the flask was 49.2 g. Benzene was added in the usual manner to dissolve the polymer and the polymer was worked up in the usual manner. There was recovered 43.7 g. (88.8% yield) of purified dried polymer having a specific viscosity of 1.989.

EXAMPLE 10

In this run the same amounts and kinds of monomers were charged as in Example 9. The other materials charged were as follows: 0.10 ml. (0.5 mole percent) of pyridine, 0.18 ml. (0.5 mole percent) of triethyl boron and 0.075 ml. (0.15 mole percent) of cumene hydroperoxide. Polymerization was conducted at about 21° C. for 2 hours. Two samples were taken during the run and an analysis of these samples yielded the following results:

| Sample No. | Time, Hours | Wt. of Sample, grams | Wt. of Polymer, grams | Conversion, Percent | Specific Viscosity |
|---|---|---|---|---|---|
| 1 | ½ | 3.76 | 1.2014 | 32.0 | 0.757 |
| 2 | 1 | 2.31 | 1.0555 | 45.7 | 0.981 |

The pot residue weighed 50.3 g. The polymer recovered, purified and dried in the usual manner. From this residue was recovered 42.3 g. (84.2% yield) of polymer having a specific viscosity of 3.471.

EXAMPLE 11

In this example the same amounts and kinds of monomers are charged as in Example 9. The charges of other materials were as follows: 0.20 ml. (1 mole percent) of pyridine, 0.37 ml. (1 mole percent) of triethyl boron and 0.52 ml. (1 mole percent) of cumene hydroperoxide. Polymerization was carried on for 2 hours at about 21°

C. and 2 samples were taken during the run. An analysis of these samples yielded the following results:

| Sample No. | Time, Hours | Wt. of Sample, grams | Wt. of Polymer, grams | Conversion, Percent | Specific Viscosity |
|---|---|---|---|---|---|
| 1 | ½ | 2.66 | 1.5292 | 57.5 | 0.490 |
| 2 | 1 | 0.87 | 0.7054 | 81.1 | 0.913 |

The residual crude product in the reactor at the end of the run was 53.4 g. Polymer recovered by usual treatment of this residue was 48.1 g. (90.1% yield) of polymer having a specific viscosity of 0.977.

EXAMPLE 12

In this example the same amounts and kinds of monomers were charged as in Example 9. The other materials charged to the reactor were as follows: 0.10 ml. (0.5 mole percent) of pyridine, 0.18 ml. (0.5 mole percent) of triethyl boron and 0.52 ml. (1.0 mole percent) of cumene hydroperoxide. Polymerization was conducted at about 21° C. for two hours. An analysis of the samples taken during the run yielded the following results:

| Sample No. | Time, Hours | Wt. of Sample, grams | Wt. of Polymer, grams | Conversion, Percent | Specific Viscosity |
|---|---|---|---|---|---|
| 1 | ½ | 4.00 | 1.5379 | 38.4 | 0.436 |
| 2 | ¾ | 2.02 | 1.1907 | 58.9 | 0.621 |

Residue remaining in the reactor at the end of the run was 49.4 g. The purified and dried polymer recovered was 44.6 g. (90.4% yield) of polymer of specific viscosity 1.259.

EXAMPLE 13

In this example the amounts and kinds of monomers charged were the same as in Example 9. Charges of other materials were as follows: 0.05 ml. (0.25 mole percent) of pyridine, 0.09 ml. (0.25 mole percent) of triethyl boron and 0.52 ml. (1 mole percent) of cumene hydroperoxide. Then the polymerization was carried out for two hours at about 21° C. Two samples were taken during the run and the results of the analysis of the samples is as follows:

| Sample No. | Time, Hours | Wt. of Sample, grams | Wt. of Polymer, grams | Conversion, Percent | Specific Viscosity |
|---|---|---|---|---|---|
| 1 | ½ | 3.54 | 1.5569 | 44.0 | 0.566 |
| 2 | 1 | 2.95 | 1.8166 | 61.6 | 0.739 |

The purified dried polymer recovered was 43.3 g. (88.2% yield) of polymer having a specific viscosity of 1.673.

EXAMPLE 14

This example represents an attempt to duplicate Example 13. The same amounts and kinds of materials were charged as in Example 13. Temperature and time of polymerization were the same and 2 samples were taken during the polymerization. Analysis of these samples yielded the following results:

| Sample No. | Time, Hours | Wt. of Sample, grams | Wt. of Polymer, grams | Conversion, Percent | Specific Viscosity |
|---|---|---|---|---|---|
| 1 | ½ | 3.25 | 1.4796 | 45.5 | 0.553 |
| 2 | 1 | 2.30 | 1.4962 | 65.1 | 0.858 |

The residue in the flask weighed at the end of the run 50.7 g. and the purified dried polymer recovered from this residue weighed 45.2 g. (89.2% yield) of a polymer having a specific viscosity of 1.597.

EXAMPLE 15

The charge of monomers was the same in this example as in Example 9. The other materials charged to the reaction were as follows: 0.05 ml. (0.25 mole percent) of pyridine, 0.09 ml. (0.25 mole percent) of triethyl boron and 0.39 ml. (0.75 mole percent) of cumene hydroperoxide. Again the polymerization run was carried out at about 21° C. for 2 hours. Analysis of the two samples taken during the reaction yielded the following results:

| Sample No. | Time, Hours | Wt. of Sample, grams | Wt. of Polymer, grams | Conversion, Percent | Specific Viscosity |
|---|---|---|---|---|---|
| 1 | ½ | 3.75 | 1.4563 | 38.8 | 0.599 |
| 2 | 1 | 2.17 | 1.2586 | 58.0 | 0.820 |

At the end of the run the residue in the flask weighed 50.2 g. and the polymer recovered from this residue weighed 44.4 g. (88.4% yield) of polymer having a specific viscosity of 1.938.

EXAMPLE 16

Again the charge of monomers was the same as in Example 9. The charge of other materials to the reactor was as follows: 0.05 ml. (0.25 mole percent) of pyridine, 0.09 ml. (0.25 mole percent) of triethyl boron and 0.26 ml. (0.5 mole percent) of cumene hydroperoxide. This polymerization run was carried out at about 21° C. for 2 hours. Analysis of the two samples taken during the run yielded the following results:

| Sample No. | Time, Hours | Wt. of Sample, grams | Wt. of Polymer, grams | Conversion, Percent | Specific Viscosity |
|---|---|---|---|---|---|
| 1 | ½ | 3.93 | 1.1130 | 28.3 | 0.848 |
| 2 | 1 | 2.46 | 1.1419 | 46.4 | 0.911 |

Residue remaining in the flask at the end of the run was 49.4 g. and the polymer recovered therefrom weighed 43.1 g. (87.2% yield) of a polymer having specific viscosity of 3.085.

EXAMPLE 17

This experiment is a duplicate of the experiment of Example 16. The reactor charge of all materials was identical to Example 16. An analysis of the two samples taken during the run yielded the following results:

| Sample No. | Time, Hours | Wt. of Sample, grams | Wt. of Polymer, grams | Conversion, Percent | Specific Viscosity |
|---|---|---|---|---|---|
| 1 | ½ | 3.71 | 1.1545 | 31.1 | 0.772 |
| 2 | 1 | 2.05 | 0.9267 | 45.2 | 0.947 |

The residue in the flask at the end of the run weighed 50.8 g. and 44.1 g. (86.8% yield) of polymer of specific viscosity 2.840 was recovered.

EXAMPLE 18

This is a blank or comparative run wherein no pyridine or other complexing agent was used. The monomers charged to the flask were as follows: 29.0 g. of oxotridecyl methacrylate, 20.5 g. of tallow methacrylate and 8.0 g. of methyl methacrylate. The monomers were cooled to 19° C. under nitrogen pressure, then in the order given 0.09 ml. (0.25 mole percent) of triethyl boron and 0.26 ml. (0.50 mole percent) of cumene hydroperoxide were added to the monomer. Polymerization was carried out for 2 hours at about 21° C. and two samples were taken during the polymerization run. An analysis of these samples yielded the following results:

| Sample No. | Time, Hours | Wt. of Sample, grams | Wt. of Polymer, grams | Conversion, Percent | Specific Viscosity |
|---|---|---|---|---|---|
| 1 | ½ | 4.48 | 0.5334 | 11.9 | 0.685 |
| 2 | 1 | 4.41 | 0.6575 | 14.9 | 0.862 |

At the end of the run it was determined that the residual reaction products remaining in the flask weighed 47.5 g. and the polymer recovered from this residue weighed 7.2 g. (15.2% yield) of polymer having specific viscosity of 1.525.

EXAMPLE 19

In this example benzoyl peroxide instead of cumene hydroperoxide was used. The charge of monomers to the flask was 29.0 g. of oxotridecyl methacrylate, 20.5 g. of tallow methacrylate and 8.0 g. of methyl methacrylate. The other materials charged to the reactor were as follows: 0.05 ml. (0.25 mole percent) of pyridine, 0.09 ml. (0.25 mole percent) of triethyl boron and 0.605 g. (1.0 mole percent) of benzoyl peroxide. This run was carried out in an analogous manner to the run of Example 9. An analysis of the two samples taken during the run yielded the following results:

| Sample No. | Time, Hours | Wt. of Sample, grams | Wt. of Polymer, grams | Conversion, Percent | Specific Viscosity |
|---|---|---|---|---|---|
| 1 | ½ | 4.22 | 0.7720 | 18.3 | 1.248 |
| 2 | 1 | 3.47 | 1.0596 | 30.5 | 1.391 |

The residue remaining in the pot at the end of the run was 47.3 g. and 23.1 g. (48.8% yield) of polymer having a specific viscosity of 2.057 was recovered from this residue.

EXAMPLE 20

This example describes the preparation of a methacrylate N-vinyl-2-pyrrolidone terpolymer. To the reaction vessel were charged 38.1 g. (0.15 mole) of lauryl methacrylate, 5.0 g. (0.05 mole) of methyl methacrylate and 4.4 g. (0.04 mole) of N-vinyl-2-pyrrolidone. The monomers were cooled in an ice bath under nitrogen blanketing to about 0° C. Then 0.53 ml. (1.5 mole percent) of triethyl boron and 0.22 ml. (0.45 mole percent) of cumene hydroperoxide were added to the monomers. Polymerization was carried on at 1-2° C. for a period of 6 hours. During the run four different samples were taken the first four hours after which time 0.28 ml. of pyridine was added to the flask. A fifth sample was then taken and all of these samples were analyzed for percent conversion and specific viscosity. Results of the analysis of these samples were as follows:

| Sample No. | Time, Hours | Wt. of Sample, grams | Wt. of Polymer, grams | Conversion, Percent | Specific Viscosity |
|---|---|---|---|---|---|
| 1 | ½ | 4.07 | 0.9342 | 23.0 | 0.351 |
| 2 | 1 | 4.18 | 1.1320 | 27.1 | 0.408 |
| 3 | 2 | 3.99 | 1.3511 | 33.9 | 0.444 |
| 4 | 4 | 2.13 | 0.9901 | 46.5 | 0.534 |
| 5 [1] | 5 | 2.36 | 1.1768 | 49.9 | 0.526 |

[1] The pyridine was added 45 minutes before this sample was taken.

The pot residue weighed 28.9 g. and the weight of polymer recovered from this residue was 9.7 g. (33.6% yield). It should be noted that polymer recovery was not too good in this example and the yield figure is probably not too accurate.

EXAMPLE 21

This example describes an experiment run in the absence of pyridine or other complexing agent. To the reactor were added 91.4 g. of lauryl methacrylate and 14.0 g. of methyl methacrylate. The monomers were then cooled to −10° C. in view of the temperature kick that occurs at the start of polymerization in the absence of a complexing agent. Then 1.10 ml. (1.5 mole percent) of triethyl boron was added followed by the addition of 0.47 ml. (0.45 mole percent) of cumene hydroperoxide. The temperature rose within a minute to 0° C. and was maintained between about 1 and 2° C. for 48 hours. During the run a number of samples were taken and an analysis of these samples yielded the following results:

| Sample No. | Time, Hours | Wt. of Sample, grams | Wt. of Polymer, grams | Conversion, Percent | Specific Viscosity |
|---|---|---|---|---|---|
| 1 | ½ | 1.93 | 0.4598 | 23.8 | 0.340 |
| 2 | 1 | 1.94 | 0.5474 | 28.2 | 0.431 |
| 3 | 2 | 1.85 | 0.6304 | 34.1 | 0.514 |
| 4 | 3 | 1.89 | 0.7554 | 40.0 | 0.528 |
| 5 | 4 | 1.85 | 0.8822 | 47.7 | 0.569 |
| 6 | 5 | 1.92 | 0.9370 | 48.8 | 0.625 |
| 7 | 6 | 1.74 | 0.9599 | 55.2 | 0.630 |
| 8 | 24 | 1.11 | 0.6790 | 61.2 | 0.851 |
| 9 | ([1]) | 88.5 | 75.8 | 85.6 | 0.955 |

[1] Remainder.

The polymer was recovered from the samples in the usual manner.

EXAMPLE 22

This experiment was carried out in the usual fashion. The reactor charge was as follows: 38.1 g. (0.15 mole) of lauryl methacrylate, 5.0 g. (0.05 mole) of methyl methacrylate, 4.4 g. (0.04 mole) of N-vinyl-2-pyrrolidone, 0.53 ml. (1.5 mole percent) of triethyl boron, 0.22 ml. (0.45 mole percent) of cumene hydroperoxide and 0.28 ml. (1.5 mole percent) of pyridine. The materials were charged to the reaction in the usual fashion. Polymerization time at about 1-2° C. was 4 hours. Calculated yield was 93% of a polymer having a specific viscosity at 1% polymer in benzene at 25° of 3.152. This polymer showed good carbon black dispersency properties.

EXAMPLE 23

This experiment was started in mass polymerization and finished in the presence of oil. The charge of monomers was 38.1 g. of the mixture of straight-chain alkyl methacrylates referred to in Example 4, 5.0 g. of methyl methacrylate and 4.4 g. of N-vinyl-2-pyrrolidone. The monomers were cooled down to about 0° C. under nitrogen blanketing and the pyridine, triethyl boron and cumene hydroperoxide were added to the reaction mixture in the order listed. Amounts of these materials were 0.28 ml. (1.5 mole percent) of pyridine, 0.53 ml. (1.5 mole percent) of triethyl boron and 0.22 ml. (0.45 mole percent) of cumene hydroperoxide. The polymerization was carried out at about 1-2° C. for 6 hours. At the end of two hours after the start of polymerization, 48.6 g. of white mineral oil was added to the reaction flask. At the end of 6 hours, an additional 47.2 g. of white mineral oil were added to the reaction mass. This reaction mixture was let stand at room temperature over the weekend. Polymerization appeared complete. Then 15.0 g. of white mineral oil was added to bring the polymer concentration as charged to 30%. The specifications for white mineral oil are as follows:

*White mineral oil*

| | |
|---|---|
| Standard Oil Co. white oil, U.S.P. No. | 210 |
| Viscosity at 210° F., centistokes | 6.26 |
| Viscosity at 100° F., centistokes | 45.21 |
| Viscosity index | 92.8 |

EXAMPLE 24

In this example the monomers charged to the reactor were as follows: 25.4 g. (0.095 mole) of oxotridecyl methacrylate, 18.1 g. (0.055 mole) of tallow methacrylate, 5.0 g. (0.050 mole) of methyl methacrylate, and 4.4 g. (0.040 mole) of N-vinyl-2-pyrrolidone. The other materials charged to the reactor were as follows: 0.28 ml. of pyridine, 0.53 ml. of triethyl boron and 0.22 ml. of cumene hydroperoxide. In this run polymerization was for about 6 hours at about 21° C. After the reaction had proceeded for 45 minutes in mass, 44.66 g. of white mineral oil were added to the reaction mixture and after an additional 40 minutes, 40.58 g. of white mineral oil was added. The reaction mixture was allowed to stand at room temperature overnight. Then 38.30 g. of additional white mineral oil was added to give a 30% polymer in oil concentrate based on monomers charged.

EXAMPLE 25

This example describes the making of a vinyloxyethanol terpolymer by the method of the invention. The monomers charged to the reaction vessel were 38.1 g. (0.15 mole) of lauryl methacrylate, 5.0 g. (0.05 mole) of methyl methacrylate and 4.4 g. (0.05 mole) of vinyloxyethanol. The other materials charged to the reactor listed in the order in which they were charged are 0.30 ml. (1.5 mole percent) of pyridine, 0.55 ml. (1.5 mole percent) of triethyl boron, and 0.23 ml. (0.45 mole percent) of cumene hydroperoxide. Polymerization was carried on for 4 hours at about 1–2° C. A portion of the reaction mixture was worked up yielding 14.6 g. of purified polymer and resulting in a calculated yield of 93%. The polymer had a specific viscosity of 3.152. This polymer product had very good carbon black dispersency properties.

EXAMPLE 26

This example describes the preparation of another polymer by the method of the invention. To the reaction vessel were added 25.4 g. of oxo-tridecyl methacrylate, 18.1 g. of tallow methacrylate, 5.0 g. of methyl methacrylate, 10.0 g. of vinyloxyethanol, and 0.377 ml. of pyridine. The monomers and pyridine were cooled under nitrogen blanketing to 20° C. Then 0.688 ml. of triethyl boron was added to the reaction mixture followed by the addition of 0.292 ml. of cumene hydroperoxide. The polymerization time at a temperature of about 20° C. was 6 hours. The first hour of polymerization was carried out in mass but after 1 hour the viscosity of the mass became so great that dilution was necessary. Dilution was carried out during the second hour of polymerization by adding 58.5 g. of white mineral oil in seven 10 ml. portions at 10 minute intervals with stirring. No further oil was added after 2 hours and before the end of the 6-hour polymerization period. After 6 hours the reaction mixture was diluted with 25 ml. benzene and 78.0 g. of base oil No. 1 were added to reduce the solids concentration in total oil to 30.0%. Benzene was stripped under vacuum to a maximum of 150° C. to yield the final 30% concentrate. The weight percent of vinyloxyethanol in the polymer was found to be 8.64.

Base oil No. 1

This is a solvent refined Mid-Continent petroleum lubricating oil having the following properties:

Viscosity at 210° F., centistokes _____ 3.94
Viscosity at 100° F., centistokes _____ 21.58
Viscosity index _____ 75.3
Specific gravity 25°/25° C. _____ 0.886
Flash point, Cleveland open cup _____° F__ 375

EXAMPLE 27

This example was carried out in an analogous manner to Example 26 except the step involving dilution with white mineral oil during the polymerization. Reactants, amounts, temperature, and time was identical to Example 26. In this case the 58.5 g. white mineral oil for dilution was added as follows: 10 ml. at 1 hour; 10 ml. at 1 hour 10 minutes; 10 ml. at 1 hour 20 minutes; 5 ml. at 1 hour 40 minutes; 5 ml. at 2 hours; 2.5 ml. at 2 hours 30 minutes; 2.5 ml. at 3 hours; 2.5 ml. at 4 hours; 2.5 ml. at 5 hours and 20 ml. at 6 hours. The product was finished to a 30% solids in oil concentration in analogous fashion to Example 26 by adding 78 g. of base oil No. 1. Vinyloxyethanol in the polymer was found to be 8.6%.

During this run the viscosity of the reaction mixture was followed by observing the current drawn by the motor of the stirrer used to agitate the reaction mixture. When the reaction mixture tended to be quite viscous as indicated by a sharp increase in ammeter current, white mineral oil was added to dilute the mixture as shown above.

EXAMPLE 28

To the reaction vessel were added 24 g. of n-lauryl methacrylate, 18 g. of tallow methacrylate, 6.0 g. of methyl methacrylate, 12.0 g. of vinyloxyethanol, and 0.139 ml. of pyridine. The monomers and pyridine were cooled under nitrogen blanketing to 20° C. Then 0.253 ml. of triethyl boron was added followed by 0.358 ml. of cumene hydroperoxide. The polymerization time at 20° C. was 6 hours. As in Example 26 the polymerization was started in mass and in this case was continued so for 2 hours. Dilution with 60 g. of white mineral oil was carried out according to the following: 5 ml. at 2 hours 15 minutes; 5 ml. at 2 hours 25 minutes; 5 ml. at 2 hours 30 minutes; 5 ml. at 2 hours 35 minutes; 5 ml. at 2 hours 45 minutes; 5 ml. at 3 hours; 5 ml. at 3 hours 15 minutes; 5 ml. at 3 hours 30 minutes; 5 ml. at 4 hours 30 minutes; 5 ml. at 5 hours; 5 ml. at 5 hours 45 minutes; and 15 ml. at 6 hours. After 6 hours the reaction mixture was diluted with 25 ml. benzene and 80 g. base oil No. 1 to reduce the solids concentration in total oil to 30%. Benzene was stripped under vacuum to a maximum of 150° C. to yield the final 30% concentrate.

Although the reactants were different, the reaction of this example was carried out in a somewhat similar manner to Example 27 except that according to plan, each time the reaction mixture became too viscous to stir as indicated by ammeter readings, a small increment of mineral oil was added to reduce the viscosity. The mineral oil additions were as indicated above.

EXAMPLE 29

This is an alkyl methacrylate/vinyl acetate polymerization by the process of the invention. The monomers charged to the reaction flask were 15.7 g. of the mixture of straight-chain alkyl methacrylates referred to in Example 4, and 6.0 g. of vinyl acetate. The other materials charged were 0.30 ml. (1.5 mole percent) of pyridine, 0.55 ml. (1.5 mole percent) of triethyl boron and 0.23 ml. (0.45 mole percent) of cumene hydroperoxide. Polymerization was carried out for a period of 2½ hours at about 1–2° C. Then 100.6 g. of white mineral oil was added to the reaction mixture. Then the reaction was allowed to continue overnight at the same reaction temperature to give a total polymerization time of 20 hours. At the end of the 20 hours, 20.0 g. of mineral white oil was added to the reaction mixture to give a 30% polymer concentrate based on monomers charged.

EXAMPLE 30

This example describes the polymerization of styrene with cumene hydroperoxide-triethyl boron catalyst in the absence of any complexing agent. To a tubular reactor were charged 26 g. (0.25 mole) of styrene. The reactor was placed in an ice bath and was flushed out several times with nitrogen. During the run a nitrogen blanket was maintained over the reactants. After 45 minutes in the ice bath, 0.18 ml. (0.5 mole percent) of triethyl boron was added to the reactor followed by 0.52 ml. (1.0 mole percent) of cumene hydroperoxide. Shortly after the addition of the last ingredient, it was noted that the reaction mixture was cloudy. The reaction mixture was left overnight in an ice bath and the next morning the mixture was clear. After 17 hours in an ice bath the reaction mixture was allowed to warm up to room temperature and after 7 hours at room temperature the reaction mixture was poured into methanol and the polymer separated by filtration. The recovered polystyrene was dried in a vacuum oven overnight at 60° C. Weight of recovered and dried polymer was 0.64 g. or 2.6% yield of polymer based on the styrene charged.

EXAMPLE 31

This example illustrates the polymerization of styrene by the method of the invention. The procedure in this example is identical with the procedure used in Example 30. To a tubular reactor were charged 26 g. (0.26 mole) of styrene and 0.10 ml. (0.5 mole percent) of pyridine. Then 0.18 ml. (0.5 mole percent) of triethyl boron was added followed by the addition of 0.52 ml. (1.0 mole percent) of cumene hydroperoxide. The reaction mixture maintained at ice bath temperatures remained clear initially but developed a slight haze after 1 hour. The reaction mixture was left in an ice bath overnight. The next morning the reaction mixture was clear and it was allowed to remain in the ice bath for a total of 17 hours after which time the reactor and contents were allowed to warm to room temperature. A thermometer placed in the reaction mixture showed a temperature of about 2° C. above room temperature. After 7 hours at room temperature, the reaction mixture was poured into methanol and the polystyrene was separated by filtration. After drying the polystyrene overnight in a vacuum oven at 60° C., 7.50 g. (28.8% yield) of polystyrene were recovered. This example clearly demonstrates the superiority of the process of the invention for the polymerization of styrene even though no attempt has been made to adjust reaction conditions for optimum yield.

In Table I below the experimental examples are summarized.

The specifications for base oil No. 2 are as follows:

Base oil No. 2

This is a solvent refined Mid-Continent petroleum lubricating oil having the following properties:

Viscosity at 210° F., centistokes _____ 10.39
Viscosity at 100° F., centistokes _____ 91.73
Viscosity index _____ 103.4
Flash point, Cleveland open cup _____° F__ 450

What is required in the process of the invention is a base complexing agent for the boron compound that is not too weak and yet not too strong. The ionization constant of a base is a measure of basicity and also of complexing strength and base complexing agents such as pyridine and p-toluidine have been found to be satisfactory as will be seen from the experimental examples. Pyridine has an ionization constant of about $1.4 \times 10^{-9}$ at 25° C. and p-toluidine has an ionization constant of $2 \times 10^{-9}$. Aniline has an ionization constant of $3.83 \times 10^{-10}$ and the data of Table 1 indicate that aniline is not nearly as effective as pyridine, aniline being a weaker base. On the other hand the strong base tri-n-butyl amine having an ionization constant of about $10^{-4}$ is very unsatisfactory being even less effective than no complexing agent. Thus complexing agents to be satisfactory for the process of the invention should be bases having ionization constants of less than $10^{-5}$ and greater than $10^{-11}$, preferably in the range of about $10^{-6}$ or $10^{-7}$ to $5 \times 10^{-10}$ or $10^{-10}$. Furthermore, the process of the invention can be better controlled if no monomers or comonomers in any substantial amount are used, which have ionization constants greater than about $10^{-11}$.

EXAMPLE 32

This example describes an experiment carried out at about 25° C. polymerizing methyl methacrylate with a catalyst of the invention. The reaction flask was a 300

TABLE 1

| Ex. No. | Monomers | Monomer Molar Ratio | Mol Percent CHP [6] | Mol Percent BEt₃ | Mol Percent Amine [1] | ° C. Temp. | Time, Hours | Conv., Percent | Sp. Visc.[8] in C₆H₆ | Sp. Visc.[9] in Base Oil No. 2 100° F. | Sp. Visc.[9] in Base Oil No. 2 210° F. | Efficiency |
|---|---|---|---|---|---|---|---|---|---|---|---|---|
| 1 | LM/MM | 72/28 | 0.45 | 1.5 | 1.5 | 1-2 | 21 | 93.7 | 1.746 | 1.442 | 2.367 | 1.641 |
| 2 | LM/MM | 72/28 | 0.45 | 1.5 | 1.5+ | 1-2 | 6 | 86.0 | 3.892 | | | |
| 3 | LM/MM | 72/28 | 0.45 | 1.5 | 1.5 | 1-2 | 6 | 96.1 | 2.700 | | | |
| 4 | LoM/MM | 72/28 | 0.45 | 1.5 | [2] 1.5 | 1-2 | 6 | 54.2 | 0.467 | | | |
| 5 | LoM/MM | 72/28 | 0.45 | 1.5 | [3] 1.5 | 1-2 | 6 | 11.6 | 0.702 | | | |
| 6 | LoM/MM | 72/28 | 0.45 | 1.5 | [4] None | 1-2 | 6 | 26.4 | 1.019 | | | |
| 7 | LoM/MM | 72/28 | 0.45 | 1.5 | [5] 1.5 | 1-2 | 4 | 81.5 | 0.408 | | | |
| 8 | TrM/TaM/MM | 43.3/24.9/31.8 | 0.45 | 1.5 | 1.5 | 21 | 2 | 90.6 | 1.345 | 1.395 | 2.022 | 1.449 |
| 9 | TrM/TaM/MM | 43.3/24.9/31.8 | 0.30 | 1.0 | 1.0 | 21 | 2 | 88.8 | 1.989 | | | |
| 10 | TrM/TaM/MM | 43.3/24.9/31.8 | 0.15 | 0.5 | 0.5 | 21 | 2 | 84.2 | 3.471 | | | |
| 11 | TrM/TaM/MM | 43.3/24.9/31.8 | 1.0 | 1.0 | 1.0 | 21 | 2 | 90.1 | 0.977 | | | |
| 12 | TrM/TaM/MM | 43.3/24.9/31.8 | 1.0 | 0.5 | 0.5 | 21 | 2 | 90.4 | 1.259 | | | |
| 13 | TrM/TaM/MM | 43.3/24.9/31.8 | 1.0 | 0.25 | 0.25 | 21 | 2 | 88.2 | 1.673 | | | |
| 14 | TrM/TaM/MM | 43.3/24.9/31.8 | 1.0 | 0.25 | 0.25 | 21 | 2 | 89.2 | 1.597 | | | |
| 15 | TrM/TaM/MM | 43.3/24.9/31.8 | 0.75 | 0.25 | 0.25 | 21 | 2 | 88.4 | 1.938 | | | |
| 16 | TrM/TaM/MM | 43.3/24.9/31.8 | 0.50 | 0.25 | 0.25 | 21 | 2 | 87.2 | 3.085 | | | |
| 17 | TrM/TaM/MM | 43.3/24.9/31.8 | 0.50 | 0.25 | 0.25 | 21 | 2 | 86.8 | 2.840 | | | |
| 18 | TrM/TaM/MM | 43.3/24.9/31.8 | 0.50 | 0.25 | None | 21 | 2 | 15.2 | 1.525 | | | |
| 19 | TrM/TaM/MM | 43.3/24.9/31.8 | [7] 1.0 | 0.25 | 0.25 | 21 | 2 | 48.8 | 2.057 | | | |
| 20 | LM/MM/V2P | 62.5/20.8/16.7 | 0.45 | 1.5 | None | 1-2 | 2 | 33.6 | | | | |
| 21 | LM/MM | 72/28 | 0.45 | 1.5 | None | 1-2 | 48 | 85.6 | 0.955 | | | |
| 22 | LM/MM/V2P | 62.5/20.8/16.7 | 0.45 | 1.5 | 1.5 | 1-2 | 4 | 93 | 3.152 | | | |
| 23 | LoM/MM/V2P | 61.2/21.6/17.2 | 0.45 | 1.5 | 1.5 | 21 | 6 | | | 0.819 | 1.395 | [10] 1.703 |
| 24 | TrM/TaM/MM/V2P | 39.6/22.9/20.8/16.7 | 0.45 | 1.5 | 1.5 | 1-2 | 6 | | | 1.386 | 1.908 | [10] 1.377 |
| 25 | LM/MM/VOE | 60/20/20 | 0.45 | 1.5 | 1.5 | 1-2 | 4 | 93 | 1.209 | 0.669 | 1.198 | 1.791 |
| 26 | TrM/TaM/MM/VOE | 30.3/17.5/15.9/36.3 | 0.45 | 1.5 | 1.5 | 20 | 6 | 95+ | | 0.334 | 0.505 | 1.512 |
| 27 | TrM/TaM/MM/VOE | 30.3/17.5/15.9/36.3 | 0.45 | 1.5 | 1.5 | 20 | 6 | 95+ | | 0.359 | 0.547 | 1.524 |
| 28 | LM/TaM/MM/VOE | 27.4/15.8/17.4/39.4 | 0.5 | 0.5 | 0.5 | 20 | 6 | 95+ | | 0.564 | 0.954 | 1.691 |
| 29 | LoM/VA | 71/29 | 0.45 | 1.5 | 1.5 | 1-2 | 20 | | | 0.679 | 0.847 | [10] 1.247 |
| 30 | Styrene | | 1.0 | 0.5 | 0.5 | 0-25 | 17 | 2.56 | | | | |
| 31 | do | | 1.0 | 0.5 | 0.5 | 0-25 | 17 | 28.8 | | | | |

[1] Amine is pyridine unless otherwise specified.
[2] Amine is aniline.
[3] Amine is tri-n-butyl amine.
[4] 1.5 mol percent n-butyl ether added.
[5] Amine is p-toluidine.
[6] Cumene hydroperoxide.
[7] Benzoyl peroxide instead of CHP.
[8] Specific viscosity in benzene at 25° C. and 1% polymer concentration.
[9] Specific viscosity in Base Oil No. 2 with 3% polymer concentration.
[10] Polymer made up to a 30% concentrate in white mineral oil or white mineral oil and Base Oil No. 1 before dilution to 3% with Base Oil No. 2.

Monomer Key:
LM=Lauryl methacrylate.
MM=Methyl methacrylate.
V2P=N-vinyl-2-pyrrolidone.
VOE=Vinyloxyethanol.
LoM=The mixture of straight-chain alkyl methacrylates described in Example 4.
VA=Vinyl acetate.
TrM=Oxotridecyl methacrylate.
TaM=Tallow methacrylate.

ml. 3-necked flask equipped with a mechanical stirrer, a nitrogen inlet and a thermocouple for temperature measurement. The system was purged with nitrogen both during polymerization and for a thirty minute period prior to the addition of the reactants. The water bath providing heat for the polymerization vessel was adjusted to 25° C. and the flask was charged with the following materials in the order of which they are listed:

(1) 25 ml. of benzene (purified by distillation of calcium hydride);
(2) 25 ml. (23.25 g.) of methyl methacrylate (distilled over Wood's metal and quinone);
(3) 0.07 ml. of cumene hydroperoxide solution (70%) (0.2 mole percent), 0.23 ml. of triethylboron/pyridine equimolar complex ($2.00 \times 10^{-3}$ mole/ml.; to give 0.2 mole percent triethylboron base on monomer charge).

Polymerization temperature was 25–25.5° C. and polymerization time one hour. At the end of the one hour polymerization time the clear, colorless reaction mixture (somewhat viscous) was added to approximately 400 ml. of methanol and 15 ml. of ammonium hydroxide. The polymer was filtered quickly from the methanol mixture and was dried to constant weight at 50° C. under vacuum in a glass fritted filter. Yield of polymer was 2.11 g. This represents a percent conversion based on the methyl methacrylate monomer charged of 9.06%.

A second experiment was run under identical conditions and with the identical charge of materials except that the polymerization time was 2.0 hours, the yield of polymer was 4.36 g. and the percent conversion 18.8%.

EXAMPLE 33

This is an experiment wherein 15% molar excess of pyridine was used over that required for a 1:1 molar ratio with the boron compound. In all other respects the experiment was identical with the experiment of Example 32 in which the polymerization time was 2 hours. Yield of polymer was 4.00 g. and percent conversion 17.2%. It appeared from this experiment that there was less effect from an excess of pyridine than from previous experiments run at about 0° C. and in which no solvent such as benzene was used. Therefore, it was decided to run two additional experiments at 25° C. to clarify this matter.

EXAMPLE 34

In the first experiment only 50% of a molar equivalent of pyridine as compared to the amount of boron compound was used. This experiment was run in an identical manner otherwise than the experiment of Example 32. The charge to the reaction flask was as follows:

(1) 25 ml. benzene (distilled over calcium hydride under nitrogen);
(2) 25 ml. (23.25 g.) of methyl methacrylate (distilled over quinone and Wood's metal under nitrogen);
(3) 1.0 ml. pyridine/benzene solution (0.018 ml. pyridine);
(4) 0.07 ml. triethylboron (0.2 mole percent);
(5) 0.1 ml. cumene hydroperoxide (0.2 mole percent).

Polymerization time was 2 hours and polymerization temperature 26.1° C. (bath temperature 25.5° C.). Yield of polymer was 4.17 g. and conversion 17.9%.

EXAMPLE 35

This example describes a run identical to the run of Example 32 except that 100% molar excess of pyridine as compared to the amount of boron compound was used. The charge to the reaction flask was the same as in Example 34 except that the amount of pyridine was 4.0 ml. pyridine/benzene solution (0.072 ml. pyridine). It should be noted that 0.07 ml. of triethylboron equals 0.0462 g. of 0.00046 mole. Polymerization time was 2.0 hours and temperature 25.55° C. Yield of polymer was 4.05 g. and percent conversion 17.4%. It appears from the experiments of Examples 34 and 35 that in fact either more or less than a molar amount of pyridine as compared to the boron compound does not have as much effect in reducing percent conversion at 25° C. as compared with about 0° C. polymerization.

EXAMPLE 36

This is a polymerization wherein the complexing agent is dimethyl benzyl amine in 1:1 molar ratio with triethylboron. This run was conducted in an identical manner to the run of Example 32 except as described below. To the flask was charged the following ingredients in the order specified:

(1) 25 ml. benzene (distilled over calcium hydride under nitrogen);
(2) 25 ml. (23.25 g.) of methyl methacrylate (distilled over Wood's metal and quinone under nitrogen);
(3) 0.1 ml. of 70% cumene hydroperoxide;
(4) 0.25 ml. triethylboron/dimethyl benzyl amine complex ($1.86 \times 10^{-3}$ moles triethylboron/ml. solution; to give 0.2 mole percent).

Polymerization time was two hours and polymerization temperature was 25.55° C.; however, the workup of the polymer was slightly different than with the Example 2 experiment. In this experiment the polymer was precipitated in 1000 ml. of methanol with the polymer solution being added slowly almost dropwise to the methanol which was stirred vigorously. The polymer was filtered off through a tared fritted glass filter and was then dried to constant weight in a vacuum oven at 50° C. Yield of polymer was 0.80 g. and percent conversion 3.4%.

EXAMPLE 37

This experiment was run in an identical manner to the experiment of Example 36 except that the complexing agent in 1:1 molar ratio with the boron compound was dimethyl cyclohexylamine. Thus the charge of complex as item 4 to the reaction vessel was 0.25 ml. of triethylboron/dimethyl cyclohexylamine complex ($1.84 \times 10^{-3}$ mole triethylboron/ml. complex solution; to give 0.2 mole percent). Polymerization time was two hours and polymerization temperature 25.55° C. Yield of polymer was 0.50 g. and percent conversion 2.15%.

EXAMPLE 38

This experiment was run in an identical manner to the experiment of Example 36 except that the complexing agent was triethylamine in a 1:1 molar ratio with the triethylboron compound so the item 4 charge to the reaction vessel was 0.27 ml. triethylboron/triethylamine complex ($1.73 \times 10^{-3}$ moles triethylboron/ml. complex solution; to give 0.2 mole percent). Polymerization time was two hours and polymerization temperature 25.55° C. Yield of polymer was 0.07 g. and percent conversion 0.3%.

EXAMPLE 39

The complexing agent for this experiment was nicotine and it was used in a 1:1 molar ratio to the boron compound. In all other respects the polymerization was carried out in an identical manner to the experiment of Example 36. Thus the item 4 charge to the reaction vessel was 0.27 ml. of triethylboron/nicotine equimolar complex ($1.70 \times 10^{-3}$ moles triethylboron/ml. complex solution; to give 0.2 mole percent). Polymerization time was two hours and polymerization temperature 25.85° C. Yield of polymer was 4.09 g. and percent conversion 17.6%. It should be noted that in all the examples of this specification the molar ratio of boron compound to complexing agent is 1:1 unless stated otherwise.

EXAMPLE 40

This is a control experiment wherein no complexing agent was used. This experiment was carried out in an identical manner to the experiment of Example 36 except that no complexing agent was used with the boron compound. The charge to the reaction vessel listed in order of the charging of the materials was as follows:

(1) 25 ml. benzene (distilled over calcium hydride under nitrogen);
(2) 25 ml. methyl methacrylate (distilled over quinone and Wood's metal under nitrogen);
(3) 0.1 ml. 70% cumene hydroperoxide (0.2 mole percent);
(4) 0.07 ml. triethylboron (0.2 mole percent).

Polymerization time was 2 hours and polymerization temperature 25.55° C. Yield of polymer was 0.7 g. and percent conversion 3.0%.

An examination of the experimental data above indicates that the most effective complexing agents tested falling within the ionization constant limits were aromatic amines such as pyridine, p-toluidine and nicotine; however, the operability of other than aromatic amines such as dimethyl benzylamine is also demonstrated.

EXAMPLE 41

In this experiment pyridine was the complexing agent and t-butyl hydroperoxide was used as the peroxygen compound. The reactor was a tubular reactor and the reaction was blanketed with nitrogen during the polymerization. A 25° C. water bath was used to heat the reaction mixture. The charge to the reactor was as follows:

25 ml. of benzene,
25 ml. methyl methacrylate,
0.15 ml. t-butyl hydroperoxide,
1.15 ml. tributylboron/pyridine 1:1 molar complex.

These amounts of peroxide and boron compound complex represent 0.5 mole percent based on the methacrylate monomer. The polymerization was run for 20 minutes, then the contents of the polymerization flask were poured into methanolic ammonium hydroxide, the reaction mixture was filtered to retain the polymer on the filter, the polymer was washed and dried in a vacuum oven overnight. Yield of polymer was 1.1 g., which represents 4.7% conversion. A 0.1% polymer solution in benzene was measured for specific viscosity which was determined to be 0.018.

EXAMPLE 42

This example describes an experiment wherein a copolymer of acrylamide and methyl methacrylate was made using a catalyst of the invention. To the tubular reactor, 3 g. of acrylamide and 3 g. of methyl methacrylate were added and melted together. Then to the reactor was added 0.1 ml. of cumene hydroperoxide plus 0.2 ml. of tributylboron/pyridine 1:1 molar complex. Polymerization was very fast.

EXAMPLE 43

This example describes the copolymerization of acrylonitrile and vinylidene chloride in a weight ratio of 4:1. The reaction vessel was a 500 ml. flask fitted with a mechanical stirrer, a nitrogen inlet, a condenser and a thermocouple for temperature recording. The system was purged with nitrogen for more than 30 minutes and the water bath providing heat for the flask was adjusted to 25° C. The reactants were then added to the flask in the order listed below:

(1) 100 ml. of benzene (distilled over calcium hydride under nitrogen);
(2) 19.8 g. (24.8 ml.) of acrylonitrile (0.374 mole) distilled over quinone under nitrogen—80% acrylonitrile;
(3) 5.2 g. (4.29 ml.) vinylidene chloride (0.054 mole) (as received)—20% $VCl_2$;
(4) 0.42 ml. (0.2 mole percent) of triethyl boron/pyridine complex 1:1 molar ratio ($2.0 \times 10^{-3}$ mole per ml.);
(5) 0.18 ml. (0.2 mole percent) of 70% cumene hydroperoxide.

The density of the acrylonitrile was 0.797 g./ml. The density of the vinylidene chloride, which had a molecular weight of 97 g./mole, was of 1.213 g./ml. Polymerization time was one hour and temperature of polymerization was 25.8–26.9° C. Since polymer had precipitated at the end of the polymerization time the mixture was filtered directly through a Buchner funnel under vacuum. The polymer was washed with benzene until it changed from yellow to white. The polymer was then air dried for 3 days then vacuum dried at 45° C. for four hours. Yield of polymer was 6.2 g. and percent conversion 24.8%. The specific viscosity of this polymer was determined to be 0.080.

EXAMPLE 44

This example describes the polymerization of vinylidene chloride and acrylonitrile in weight ratio of 3:1 with a catalyst of the invention. This polymerization was carried out in similar equipment and in a similar manner as Example 43 except as follows. The charge to the reaction vessel was as follows:

(1) 100 ml. benzene (distilled over a calcium hydride under nitrogen);
(2) 18 g. (14.8 ml.) of vinylidene chloride (0.185 mole—80 mole percent vinylidene chloride—used as received);
(3) 6 g. (7.53 ml.) of acrylonitrile (0.113 mole) (distilled over quinone under nitrogen);
(4) 0.3 ml. (0.20 mole percent) of triethylboron pyridine 1:1 molar complex ($2.0 \times 10^{-3}$ mole/ml.);
(5) 0.13 ml. (0.20 mole percent) 70% cumene hydroperoxide.

Polymerization time was one hour and polymerization temperature 25.6° C. At the end of the polymerization time the reaction mixture was added to 400 ml. of methanol while stirring and this mixture was filtered to recover the polymer on the filter. The polymer was air dried for 3 days, then vacuum dried at 45° C. for 4 hours. Yield of polymer was 0.8 g. and percent conversion 3.33%. This polymer had a specific viscosity of 0.012.

EXAMPLE 45

This experiment describes the preparation of a copolymer of methyl methacrylate and vinylidene chloride in a 90:10 molar ratio by a catalyst of the invention. The polymerization was carried out in similar equipment and in a similar manner as Example 43 except as described below. The charge to the reaction vessel was:

(1) 100 ml. hexane (distilled over calcium hydride under nitrogen);
(2) 22.5 g. (24.2 ml.) of methyl methacrylate (0.225 mole) distilled under nitrogen over alumina;
(3) 2.4 g. (1.98 ml.) of vinylidene chloride (0.0248 mole) passed through alumina under nitrogen and kept under refrigeration;
(4) 0.25 ml. (0.2 mole percent) triethylboron/pyridine 1:1 molar complex ($2.0 \times 10^{-3}$ mole/ml.);
(5) 0.11 ml. (0.2 mole percent) 70% cumene hydroperoxide.

Polymerization temperature was 25.55° C. and polymerization time 2.0 hours. At the end of the polymerization polymer had precipitated out in the hexane and the mixture was filtered, the polymer washed several times with Skellysolve. Polymer was air dried for two days, then under vacuum at 55° C. for one hour. The yield of polymer was 5.9 g. and percent conversion 23.7%. The specific viscosity of the polymer was 0.020. Analyses of the polymer indicated that the percent of vinylidene chloride in the polymer was 4.4%.

EXAMPLE 46

This example describes the polymerization of an 80:20 monomeric mixture of methyl methacrylate and vinylidene chloride with a catalyst of the invention. The polymerization apparatus and method of carrying out the polymerization was similar to that described in Example 43 except as follows. The charge to the vessel was (1) 100 ml. of hexane (distilled over calcium hydride under nitrogen);
(2) 20 g. (21.5 ml.) of methyl methacrylate (0.20 mole—distilled over alumina under nitrogen);
(3) 4.9 g. (4.04 ml.) of vinylidene chloride (0.0505 mole—passed through alumina under nitrogen and stored under refrigeration);
(4) 0.25 ml. (0.2 mole percent) of triethylboron/pyridine 1:1 molar complex ($2.0 \times 10^{-3}$ mole/ml.);
(5) 0.11 ml. (0.2 mole percent) 70% cumene hydroperoxide.

Polymerization time was 2 hours and temperature of polymerization was 26.7° C. The polymer had precipitated from the hexane and so was filtered from the reaction mixture under vacuum, the polymer washed several times with hexane on the filter, air dried overnight and dried in a vacuum oven at 55° C. for 1¼ hours. Yield of polymer was 6.4 g. and percent conversion 25.8%. The polymer had a specific viscosity of 0.020. An analysis of the polymer indicated that it contained 9.2% vinylidene chloride.

EXAMPLE 47

This example describes a polymerization of an 80:20 molar ratio of the monomers acrylonitrile and vinylidene chloride with a catalyst of the invention. The polymerization was carried out in a similar manner to Example 43. The charge of the polymerization vessel was as follows:

(1) 100 ml. hexane (distilled over calcium hydride under nitrogen);
(2) 19.8 g. (24.8 ml.) of acrylonitrile (0.374 mole) distilled over quinone under nitrogen—stored under refrigeration;
(3) 5.2 g. (4.28 ml.) of vinylidene chloride (0.054 mole) passed through activated alumina, stored under refrigeration;
(4) 0.42 ml. (0.2 mole percent) of triethylboron/pyridine 1:1 molar complex ($2.0 \times 10^{-3}$ mole/ml.);
(5) 0.18 ml. (0.2 mole percent) 70% cumene hydroperoxide.

Polymerization time was 2 hours and the polymerization temperature varied from 25.55° C. to 26.5° C. The reaction mixture was filtered to recover the polymer on the filter, the polymer was washed several times with hexane, dried overnight and finally to constant weight at 55° C. under vacuum for 1½ hours. The yield of polymer was 14.4 g. and the specific viscosity of the polymer 0.170. Percent conversion was 57.6%.

EXAMPLE 48

This experiment describes the making of a polymer from a monomer mixture of 75:25 weight ratio of vinylidene chloride and acrylonitrile mixture using a catalyst of the invention. The polymerization was carried out in a similar manner to Example 43. The charge to the reactor was:

(1) 100 ml. of hexane (distilled over calcium hydride under nitrogen);
(2) 18 g. (14.8 ml.) of vinylidene chloride (0.185 mole) passed through activated alumina, stored under nitrogen in a refrigerator;
(3) 6 g. (7.53 ml.) of acrylonitrile (0.113 mole) distilled over quinone under nitrogen and stored in a refrigerator;
(4) 0.30 ml. (0.20 mole percent) of triethylboron/pyridine 1:1 molar complex ($2.0 \times 10^{-3}$ mole/ml.);
(5) 0.13 ml. (0.20 mole percent) of 70% cumene hydroperoxide.

Polymerization temperature was 26.65° C. and the polymerization time 130 minutes. The polymer was recovered by filtration from the reaction mixture, was washed with hexane several times and the polymer air dried overnight and then to constant weight in approximately 2 hours at 55° C. under vacuum. The yield of polymer was 7.0 g. and the conversion 38.9%. The polymer had a specific viscosity of 0.070 and the percent of vinylidene chloride in the polymer was 25%.

EXAMPLE 49

This example demonstrates the polymerization of 2-ethylhexylvinyl fumarate by a catalyst of the invention. To a 10 centimeter tube by 2.5 centimeter diameter fitted with polyethylene stopper was added 5 g. of monomer. The tube was flushed with nitrogen and 0.06 ml. of cumene hydroperoxide was added, then 0.1 ml. of tributylboron/pyridine 1:1 molar complex in hexane. The tube was placed on an agitating apparatus and in one minute the contents of the tube set to a gel on the walls.

EXAMPLE 50

In this example several different peroxides were used to compare the effectiveness of the various peroxides with the complexed boron compound. These experiments were mass polymerizations wherein the monomer was polymerized as a film between two glass plates in a mold. Three experiments were run with three different hydroxides using 0.5 mole percent peroxide in each case. In the first experiment the charge was as follows:

(1) 58.8 g. methyl methacrylate;
(2) 1.2 g. of trimethylolpropane trimethacrylate;
(3) 2 ml. of tributylboron/pyridine 1:1 molar complex;
(4) 0.65 ml. cumene hydroperoxide (70%).

In the second experiment the charge was as follows:

(1) 58.8 g. of methyl methacrylate;
(2) 1.2 g. of trimethylolpropane trimethacrylate;
(3) 2 ml. of tributylboron/pyridine 1:1 molar complex;
(4) 0.94 ml. of p-menthane hydroperoxide (55%).

The charge in the third experiment was as follows:

(1) 58.8 g. of methyl methacrylate;
(2) 1.2 g. of trimethylolpropane trimethacrylate;
(3) 2 ml. of tributylboron/pyridine 1:1 molar ratio;
(4) 1.1 ml. of diisopropylbenzene hydroperoxide (53%).

The glass molds in this case were 6″ by 6″ x ⅛″ molds wherein a thermocouple had been inserted to measure the time to the exotherm. The molds were placed in a 35° C. water bath. Polymerization for all samples was carried out for 65 minutes. Times to the exotherm in each case were as follows:

| | Minutes |
|---|---|
| Experiment 1 | 37 |
| Experiment 2 | 35 |
| Experiment 3 | 38 |

Maximum temperature in each case was as follows:

| | ° C. |
|---|---|
| Experiment 1 | 73 |
| Experiment 2 | 65 |
| Experiment 3 | 73 |

A crosslinked solid polymer film was obtained in each instance.

EXAMPLE 51

This is an experiment carried out in a similar manner to the experiment of Example 50. The charge to the glass plate mold which was 6″ by 6″ by ⅛″ was as follows:

(1) 58.8 g. of methyl methacrylate;
(2) 1.2 g. of trimethylolpropane trimethacrylate;
(3) 0.6 ml. of di-t-butylperoxide (0.5 mole percent);
(4) 1.0 ml. of triethylboron/pyridine 1:1 molar complex (0.33 mole percent).

Water bath temperature was again 35° C. A 1 to 2° C. exotherm was observed in from 65–100 minutes. A desired crosslinked solid film of polymer was obtained.

EXAMPLE 52

This example describes a copolymerization of methyl vinyl ketone and acrylonitrile using a catalyst of the invention. The charge to the reaction tube was:

(1) 5 g. of methylvinylketone;
(2) 3 g. of acrylonitrile;
(3) 0.14 ml. of cumene hydroperoxide;
(4) 0.32 ml. of triethylboron/pyridine 1:1 molar complex (0.5 mole percent).

The polymerization proceeded at an extremely fast rate and was soon out of control.

EXAMPLE 53

This example describes another series of four experiments using different peroxides with complexed boron catalysts to carry out the process of the invention. This example was carried out in a similar manner to Example 50 wherein 6″ by 6″ by ⅛″ glass plate molds were used to cast a methyl methacrylate film. Polymerization temperature was 35° C. The two different peroxides used in the four experiments were methylethylketone peroxide (MEKP) and 2,5-dimethylhexane - 2,5-dihydroperoxide (2,5-2,5). The experiments are designated below as (a), (b), (c) and (d) and the charges are:

(a)

60 g. methyl methacrylate
0.22 g. 2,5-2,5 (0.2 mole percent)
0.6 ml. triethylboron/pyridine 1:1 molar complex (0.2 percent)

(b)

60 g. methyl methacrylate
0.11 g. 2,5-2,5 (0.1 mole percent)
0.6 ml. triethylboron/pyridine 1:1 molar ratio (0.2 mole percent)

(c)

60 g. methyl methacrylate
0.21 ml. MEKP (0.2 mole percent)
0.6 ml. triethylboron/pyridine 1:1 molar ratio (0.2 mole percent)

(d)

60 g. methyl methacrylate
0.10 ml. MEKP (0.1 mole percent)
0.3 ml. triethylboron/pyridine 1:1 molar ratio (0.1 mole percent)

The results of these experiments are as follows.

Time to exotherm, minutes:

| | |
|---|---|
| (a) | 65 |
| (b) | 85 |
| (c) | 155 |
| (d) | 170 |

Exotherm temperature, ° C.:

| | |
|---|---|
| (a) | 51 |
| (b) | 40 |
| (c) | About 36 |
| (d) | About 36 |

Polymerization finished, hours:

| | |
|---|---|
| (a) | 1½ |
| (b) | 1⅔ |
| (c) | 3¼ |
| (d) | 3¼ |

About 95% of the polymerization was complete after the periods of time specified above with heating at 35° C. The molds were all then subjected to an additional hour heating at 100° C. to complete the polymerization and formation of the methyl methacrylate films.

EXAMPLE 54

This example describes the polymerization of acrylonitrile with a catalyst of the invention. The reaction flask was a 500 ml. 3-necked flask having attached thereto a dropping funnel, a stirrer, a thermometer, and a nitrogen purge line to blanket the reaction mixture. A constant temperature water bath was used to heat the reaction flask. The reaction system was purged for one hour with dry nitrogen before 75 g. (79.5 ml.) of N,N-dimethylacetamide (distilled under reduced pressure) and 26.5 g. (0.5 mole, 33.2 ml.) of acrylonitrile (distilled) was added to the flask. Then while stirring 0.5 ml. of triethylboron/pyridine 1:1 molar complex ($2.06 \times 10^{-3}$ mole/ml., 0.2 mole percent of total acrylonitrile equal 0.5 ml. of complex) was added to the reaction flask. Then from the dropping funnel was added slowly 0.22 ml. of cumene hydroperoxide in 5 ml. of N,N-dimethylacetamide. Molecular weight of the cumene hydroperoxide 70% solution equals 152 g./mole (0.22 ml. equal 0.2 mole percent of acrylonitrile). Temperature of the reaction mixture varied during the reaction time from about 25 to 26° C. Total reaction time was 2.0 hours. When the polymerization was complete the reaction mixture was added to approximately 600 ml. of water while stirring. The mixture with water was allowed to stand overnight then the mixture was pressure filtered to recover the polymer on the filter and the polymer was dried at approximately 60° C. in a vacuum oven to constant weight. The yield of polymer was 10.5 g. and percent conversion 39.6%. The polymer was a hard solid polymer with a slight yellow cast. The specific viscosity of the polymer was 0.094.

EXAMPLE 55

This example describes a number of experiments wherein pyridine is the complexing agent, the polymerization is carried out at about 0° C. and the amount of complexing agent relative to the boron compound is varied. The apparatus for carrying out these experiments was a 4-necked, 100 ml. flask, fitted with a stirrer, thermowell, nitrogen inlet and outlet. The flask was placed in an ice bath. To the flask was charged in the first experiment 25 ml. of benzene and 25 ml. of methyl methacrylate, then 0.25 ml. of cumene hydroperoxide (0.5 mole percent). The mixture was stirred and cooled to about 1° C. and 0.58 ml. (0.5 mole percent) of triethylboron/pyridine complex in a 1:1 molar ratio was charged to the flask. The boron/pyridine complex was in the form of a 2 molar solution in hexane. Polymerization was carried out for 2 hours at about 1° C. Then the reaction mixture was poured into 1 liter of methanol containing ammonium hydroxide. The polymer was filtered, washed and dried overnight at approximately 60° C. in a vacuum oven. Yield of polymer was 1.67 g. representing a conversion of 7.17%.

The second experiment was identical to the first experiment except that 0.093 ml. of pyridine was added to the reaction mixture to give a 100% molar excess of pyridine over the triethylboron compound. Like the previous experiment, the polymerization time was 2 hours at about 1° C. and the workup of the polymer was the same as in the previous experiment. Yield of polymer was 0.58 g., representing a conversion of 2.49%.

The third experiment represents a run with 15% excess pyridine over an equimolar amount based on the boron compound. In this case 0.014 ml. of pyridine, representing the 15% molar excess was added to the reaction mixture of the first example. Otherwise, the charge of reactants was the same. Reaction conditions and polymer workup were also the same in this experiment. The yield of polymer was 1.22 g., representing a conversion of 5.24%.

The fourth experiment represents a run using no pyridine or other complexing agent. Charged to the reaction flask was 25 ml. of benzene, 25 ml. of methyl methacrylate, 0.25 ml. cumene hydroperoxide (0.5 mole percent)

and 0.17 ml. of triethylboron (0.5 mole percent). Reaction conditions and polymer workup were the same as in the first example. On adding the triethylboron, the temperature rose to 5.3° C. and the reaction mixture slowly cooled to 1° C. after 15 minutes. The yield of polymer was 0.40 g., representing a conversion of 1.72%.

The fifth experiment represents a run at a boron compound/pyridine molar ratio of 1.0/0.5. The charge of the reaction flask was 25 ml. of benzene, 25 ml. of methyl methacrylate, 0.25 ml. of cumene hydroperoxide (0.5 mole percent), 0.047 ml. of pyridine (0.25 mole percent), 0.17 ml. of triethylboron (0.5 mole percent). On adding the triethylboron the temperature rose to about 3.3° C. and was cooled back to 1° C. after about 10 minutes. Polymer yield was 1.27 g., representing a conversion of 5.46%.

EXAMPLE 56

This experiment represents a run using aniline as the complexing agent at 25° C. The charge to the flask was 25 ml. of benzene, 25 ml. of methyl methacrylate, 0.1 ml. of cumene hydroperoxide (0.2 mole percent), (0.042 ml. of aniline (0.2 mole percent) and 0.07 ml. of thiethylboron (0.2 mole percent). The polymerization time was 2 hours at 25° C. Workup of the reaction mixture to recover the polymer was the same as in Example 55. Polymer yield was 1.62 g., representing a conversion of 6.97%.

EXAMPLE 57

This is a run wherein vinyl chloride is the monomer. The charge to the reaction flask was 15.6 g. of vinyl chloride, 0.11 ml. of cumene hydroperoxide, 0.25 ml. of triethylboron/pyridine 1:1 molar ratio complex. The reaction vessel was a 3-necked flask fitted with a Dry-Ice condenser, stopper, and a connector fitted with a septum. About 20 ml. of vinyl chloride was distilled into the flask. The vinyl chloride was allowed to evaporate till 15.6 g. remained and the flask was closed and placed under a Dry-Ice condenser. 0.11 ml. of cumene hydroperoxide was added with a syringe through the septum, followed by 0.25 ml. of the triethylboron/pyridine 1:1 molar complex. The catalyst concentration was equal to 0.5 mole percent based on the vinyl chloride. The reaction was allowed to run for 2 hours under vinyl chloride reflux approximately −13 to −14° C. Then methanol was poured into the flask and the solids were filtered off, washed with methanol and dried in vacuum overnight at 60° C. The dry weight of polymer was 0.31 g., representing a 2% conversion.

Although the invention has been described in terms of specified embodiments which are set forth in considerable detail, it should be understood that this is by way of illustration only and that the invention is not necessarily limited thereto since alternative embodiments and operating techniques will become apparent to those skilled in the art in view of the disclosure. Accordingly modifications are contemplated which can be made without departing from the spirit of the described invention.

What is claimed is:

1. In a process for polymerizing with organoboron having an organo group attached by carbon directly to the boron and peroxygen compound catalysts olefinically unsaturated monomers which undergo addition polymerization with said catalysts and which when the monomers are basic have ionization constants less than $10^{-5}$, the improvement comprising carrying out the polymerization in the presence of an amine complexing agent for the boron compound, said complexing agent having an ionization constant in the range of $10^{-5}$ to $10^{-11}$.

2. A process of claim 1 wherein said monomers are polar monomers.

3. A process of claim 1 wherein said boron compound is a lower trialkyl boron.

4. A process of claim 1 wherein said peroxygen compound is a hydroperoxide.

5. A process of claim 1 wherein said peroxygen compound is cumene hydroperoxide.

6. A process of claim 1 wherein said complexing agent is pyridine.

7. A process of claim 1 wherein said complexing agent is p-toluidine.

8. A process of claim 1 wherein said complexing agent is nicotine.

9. A process of claim 1 wherein said complexing agent has an ionization constant in the range of about $10^{-6}$ to $10^{-10}$.

10. a process of claim 1 wherein the polymerization is carried out in the presence of an inert solvent.

11. A process of claim 1 wherein said monomers are polar monomers having ionization constants less than $10^{-6}$, said boron compound is a lower trialkyl boron, said peroxygen compound is selected from the class consisting of peroxides and hydroperoxides and said complexing agent is an amine having an ionization constant in the range of about $10^{-6}$ to $10^{-10}$.

12. A process of claim 11 wherein said monomers comprise a major amount of alkyl methacrylate having from 1 to 20 carbon atoms per alkyl group.

13. A process of claim 12 wherein said amine is pyridine and said peroxygen compound is cumene hydroperoxide.

14. A process of claim 11 wherein said monomers comprise a major amount of methyl methacrylate.

15. A process of claim 14 wherein said amine is pyridine and said peroxygen compound is cumene hydroperoxide.

16. A process of claim 11 wherein said monomers comprise a major amount of acrylonitrile.

17. A process of claim 16 wherein said amine is pyridine and said peroxygen compound is cumene hydroperoxide.

18. A process of claim 11 wherein said monomers comprise a major amount of vinylidene chloride.

19. A process of claim 18 wherein said amine is pyridine and said peroxygen compound is cumene hydroperoxide.

20. A process of claim 11 wherein said monomers comprise a major amount of vinyl chloride.

21. A process of claim 20 wherein said amine is pyridine and said peroxygen compound is cumene hydroperoxide.

22. A process of claim 1 wherein said boron compound is selected from the class consisting of $R_3B$, $RB(OR)_2$, $R_2B(OR)$, $R_2BOBR_2$, $R_2BX$, $R_2BH$ where R is a hydrocarbon radical having not more than 10 carbon atoms and X is a halogen atom.

References Cited by the Examiner
UNITED STATES PATENTS

| | | | |
|---|---|---|---|
| 3,025,284 | 3/1962 | George et al. | 260—92.8 |
| 3,106,560 | 10/1963 | Ashby et al. | 260—290 |
| 3,112,298 | 11/1963 | Welch | 260—92.1 |
| 3,166,536 | 1/1965 | Witt | 260—88.2 |
| 3,167,559 | 1/1965 | Hough | 260—290 |

FOREIGN PATENTS

| | | |
|---|---|---|
| 587,761 | 8/1960 | Belgium. |

OTHER REFERENCES

Chemical Abstracts, 57, 13800I (1962).

Furukawa et al.: Die Makromolekulare Chemie, 31, 122–39 (1958) (pages 126–133 relied upon).

JOSEPH L. SCHOFER, *Primary Examiner.*

W. HOOVER, *Assistant Examiner.*